(12) United States Patent
Mamdani et al.

(10) Patent No.: US 10,362,160 B2
(45) Date of Patent: *Jul. 23, 2019

(54) MIXED-MODE INTERACTION

(71) Applicant: Aeritas, LLC, Dallas, TX (US)

(72) Inventors: Malik Mamdani, Dallas, TX (US);
Patrick Johnson, Trophy Club, TX (US); Kevin Bomar, Weatherford, TX (US); Tim Whatley, Irving, TX (US); Curtis Grant, Flower Mound, TX (US)

(73) Assignee: Aeritas, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/888,320

(22) Filed: Feb. 5, 2018

(65) Prior Publication Data

US 2018/0295226 A1 Oct. 11, 2018

Related U.S. Application Data

(60) Continuation of application No. 15/206,621, filed on Jul. 11, 2016, now Pat. No. 9,888,107, which is a
(Continued)

(51) Int. Cl.
*H04W 24/00* (2009.01)
*H04M 1/725* (2006.01)
(Continued)

(52) U.S. Cl.
CPC ........ *H04M 1/72547* (2013.01); *G06Q 20/02* (2013.01); *G06Q 20/04* (2013.01); *G06Q 20/12* (2013.01); *G06Q 20/32* (2013.01); *G06Q 20/322* (2013.01); *G06Q 20/3272* (2013.01); *G06Q 20/36* (2013.01); *G06Q 20/385* (2013.01); *G06Q 20/4014* (2013.01); *G06Q 30/02* (2013.01); *G06Q 30/0261* (2013.01); *G06Q 30/0267* (2013.01); *G06Q 30/06* (2013.01); *H04L 67/02* (2013.01); *H04L 67/04* (2013.01); *H04M 1/72561* (2013.01); *H04M 3/4938* (2013.01);
(Continued)

(58) Field of Classification Search
USPC ................................ 455/456, 414, 426, 563
See application file for complete search history.

(56) References Cited

U.S. PATENT DOCUMENTS 9,888,107 B2 * 2/2018 Mamdani ............... G06Q 20/04

* cited by examiner

*Primary Examiner* — David Q Nguyen
(74) *Attorney, Agent, or Firm* — David H. Judson

(57) ABSTRACT

A user of a wireless device, such as a mobile phone, can make purchases or obtain information via a network, such as the Internet, using both voice and non-verbal methods. Users can submit voice queries and receive non-verbal replies, submit non-verbal queries and receive voice replies, or perform similar operations that many the voice and data capabilities of modern mobile communication devices. The user may provide notification criteria indicating under what conditions a notification should be sent to the user's wireless device. When purchasing opportunities matching the selected notification criteria become available, the user is notified. The user can respond to the notification, and immediately take advantage of the purchasing opportunity if he so desires. Mixed-mode interactions can also be used by sellers to more advantageously control the marketing of distressed, time sensitive, or other merchandise/services.

10 Claims, 4 Drawing Sheets

Related U.S. Application Data continuation of application No. 14/142,980, filed on Dec. 30, 2013, now Pat. No. 9,390,435, which is a continuation of application No. 13/290,115, filed on Nov. 6, 2011, now Pat. No. 8,620,364, which is a continuation of application No. 11/928,362, filed on Oct. 30, 2007, now Pat. No. 8,055,285, which is a continuation of application No. 11/803,848, filed on May 16, 2007, now Pat. No. 7,706,819, which is a continuation of application No. 11/179,386, filed on Jul. 12, 2005, now abandoned, which is a division of application No. 09/692,775, filed on Oct. 16, 2000, now Pat. No. 6,925,307.

(60) Provisional application No. 60/217,997, filed on Jul. 13, 2000.

(51) Int. Cl.

| | |
|---|---|
| *G06Q 20/04* | (2012.01) |
| *G06Q 20/12* | (2012.01) |
| *G06Q 20/32* | (2012.01) |
| *G06Q 20/38* | (2012.01) |
| *G06Q 20/40* | (2012.01) |
| *G06Q 30/02* | (2012.01) |
| *G06Q 30/06* | (2012.01) |
| *H04M 3/493* | (2006.01) |
| *H04W 4/12* | (2009.01) |
| *H04L 29/08* | (2006.01) |
| *G06Q 20/02* | (2012.01) |
| *G06Q 20/36* | (2012.01) |
| *H04W 4/02* | (2018.01) |
| *G10L 15/22* | (2006.01) |
| *H04W 4/18* | (2009.01) |
| *H04W 88/18* | (2009.01) |

(52) U.S. Cl.
CPC ............... *H04W 4/02* (2013.01); *H04W 4/12* (2013.01); *G10L 15/22* (2013.01); *H04M 2203/105* (2013.01); *H04M 2203/353* (2013.01); *H04M 2207/18* (2013.01); *H04M 2250/74* (2013.01); *H04W 4/18* (2013.01); *H04W 88/184* (2013.01)

MIXED-MODE INTERACTION

CROSS REFERENCE TO RELATED APPLICATIONS

This application claims the benefit of U.S. Provisional Patent Application Ser. No. 60/217,997 filed Jul. 13, 2000 entitled "MIXED-MODE INTERACTION/MOBILE PHONE BAR CODE ET AL," of common assignee herewith.

FIELD OF THE INVENTION

The present invention relates generally to wireless devices, and more particularly to wireless devices using mixed voice and data.

BACKGROUND OF THE INVENTION

In addition to their more traditional functions, mobile phones and other wireless devices are currently capable of obtaining and displaying information from the Internet or other informational networks. However, unlike computers which usually have fairly large display screens, mobile phones and other relatively small wireless devices do not provide access to the Internet that is as convenient as that provided by traditional computers. Small wonder, since traditional "web browsing" was developed with conventional sized computer displays in mind.

In order to overcome the limitations imposed by the smaller display screens of earlier wireless devices, a number of options have been pursued by wireless device manufacturers and wireless service providers to provide more suitable Internet access. One of the more prevalent methods has been to make the display screen larger. Of course, given that the overall dimensions of wireless devices have decreased, physical constraints continue to limit the effectiveness of such efforts. Another method involves making more efficient use of available screen area by limiting the display to primarily textual objects. The combination of these two methods has met with some degree of success, but other obstacles to ease of use have not been overcome.

For example, traditional web browsing sometimes requires a user to enter a uniform resource locator (URL) to access a particular web page. The small size of most wireless devices makes entering text difficult, even if a keyboard-style keypad is provided. When only a standard telephone-style keypad is provided, entering text becomes that much more difficult.

The inherent difficulties associated with using small interfaces and keypads to navigate web sites is a direct barrier to the widespread adoption of many Internet-type services. For wireless devices to become popular, an easier means for interacting with the "wireless web" would be advantageous.

SUMMARY OF THE INVENTION

Therefore, what is needed is a way to leverage the voice functionality available on many wireless devices, and the data capability associated with those same devices. Accordingly, at least one embodiment of the present invention provides a method that includes receiving spoken input from a wireless communication device, and retrieving information associated with the spoken input. The method also includes delivering, to the wireless communication device, a non-verbal response to the spoken input. The non-verbal response is based on the retrieved information. In another embodiment, the input is non-verbal and the response is verbal.

Another embodiment of the present invention provides a system comprising a server configurable to receive spoken input from a wireless communication device. The server is further configurable to retrieve information associated with the spoken input and to deliver, to the wireless communication device, a non-verbal response to the spoken input. The non-verbal response is based on the retrieved information. In another embodiment, the input is non-verbal and the response is verbal.

Yet another embodiment of the present invention provides a method that includes obtaining, from a wireless communication device user, purchase notification criteria, obtaining information associated with purchasing opportunities, and selecting purchasing opportunities based, at least in part, on the purchase notification criteria. The method further includes notifying the user of selected purchasing opportunities via a wireless communication device, receiving spoken input from the wireless communication device in response to the notification, and delivering, to the user's wireless communication device, a non-verbal response to the spoken input. In another embodiment, the input is non-verbal and the response is verbal.

An advantage of at least one embodiment of the present invention is that obtaining information from the Internet is more convenient than using conventional wireless Internet access methods.

Another advantage of an embodiment of the present invention is that making purchases from the Internet is easier than using conventional wireless purchasing methods.

An additional advantage of at least one embodiment of the present invention is that merchants, suppliers and vendors can more effectively market distressed, time sensitive, location sensitive or general inventories of goods or services.

Yet another advantage of an embodiment of the present invention is that suppliers can more easily communicate with potential customers in a manner preferred by the customer, thereby increasing customer responsiveness.

A further advantage is that various methods according to the present invention can be implemented using the voice and data capabilities of existing wireless devices.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF A PREFERRED EMBODIMENT OF THE INVENTION

FIGS. 1-4 illustrate a mixed voice/data wireless system that can be used in conducting Internet commerce. As discussed in greater detail below, various embodiments of such a mixed-mode wireless system allow wireless customers to make voice requests from their wireless devices and receive data responses using the same, or different wireless devices. Alternatively, non-verbal requests can be made and verbal responses received.

Figure 1:
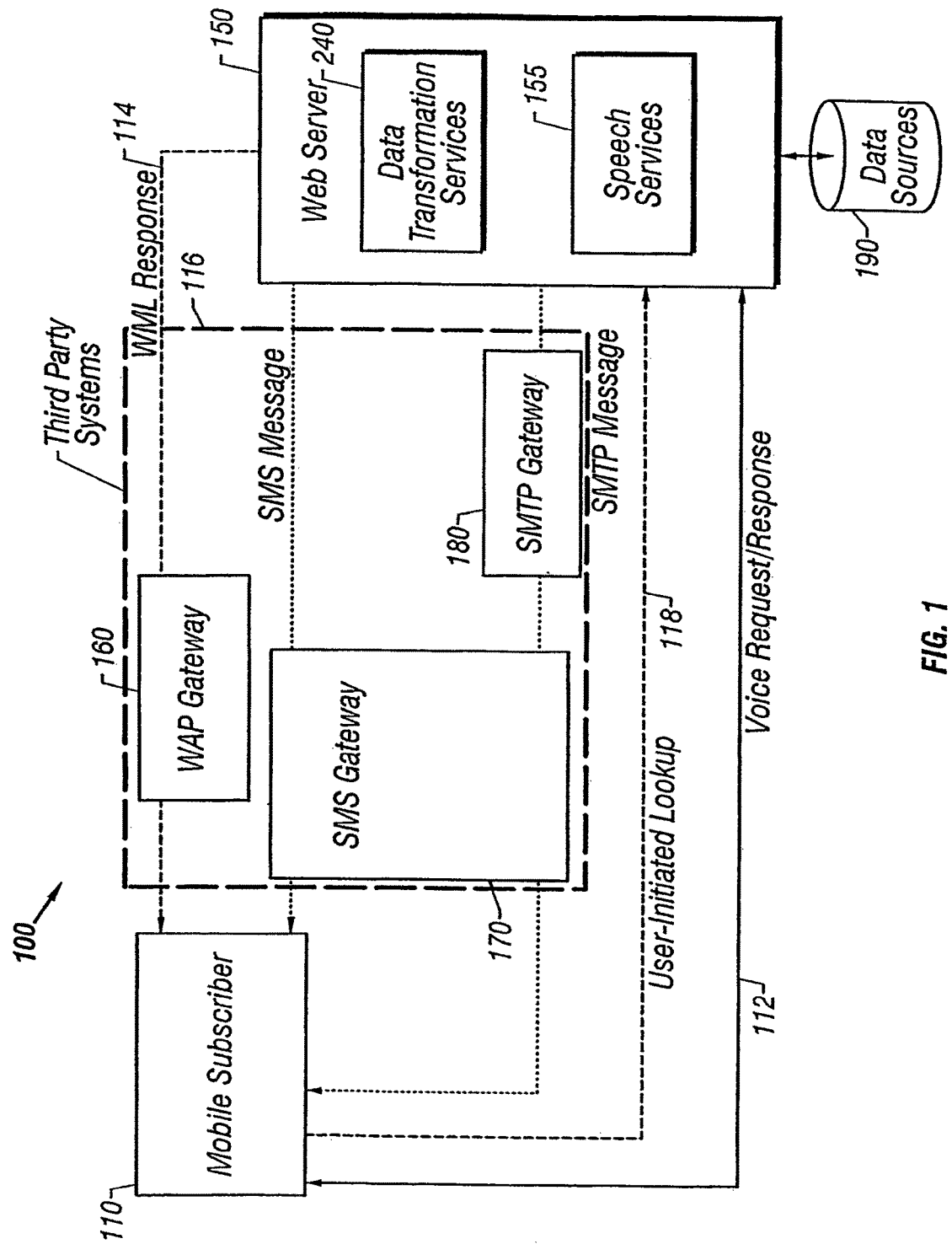
FIG. 1 is a block diagram illustrating various types of communication paths between a mobile subscriber and a server, according to one embodiment of the present invention.

Referring first to FIG. 1, various mixed communication paths between a mobile subscriber 110 and a web server 150 will be discussed. Mobile subscriber 110 preferably includes individuals who are using wireless devices having both voice and data capabilities, however in at least one embodiment a combination of one device having voice capabilities and another device having data capabilities can be used. Primary examples of devices having both voice and data capabilities are certain cellular and PCS telephones. Devices having only voice capabilities include older mobile phones, two-way radios and the like, while devices having data capability include pagers, personal digital assistants (PDAs), most common portable computers, and the like.

In at least one embodiment, mobile subscriber 110 initiates communication with web server 150 by issuing a voice request for information via voice request/response channel 112. Voice request/response channel 112 includes any necessary cellular or PCS stations, telephone lines, repeaters, routers, communications switches, etc. which are commonly used in making voice calls from a mobile phone or other wireless device. The voice request is received by the speech services 155 of web server 150, which translates the voice request into a data format more suitable for processing by web server 150. Web server 150, using data transformation services 240 or otherwise, retrieves the information requested by mobile subscriber 110 by accessing data sources 190. Data sources 190 are preferably accessible through a network, such as the Internet, but may include privately accessible data sources under the control of the same person or organization controlling web server 150. Once web server 150 has retrieved the necessary information from data sources 190, the information is delivered to mobile subscriber 110 in a non-verbal format.

In other embodiments, mobile subscriber 110 initiates communication using a non-voice request submitted via user-initiated lookup channel 118, and voice request/response channel 112 is used to deliver a response to the non-voice request. The non-verbal request is processed by web server 150, and the results are converted to voice format using speech services 155. The voice formatted results are then provided to mobile subscriber 110 via voice request/response channel 112. Except where specifically noted, throughout the remainder of this document, reference to procedures, events, methods, etc., in which a mobile subscriber initiates communication via a voice request and receives a non-verbal response are intended to cover the converse situations in which the user initiates communication via non-verbal means and receives a voice response.

As discussed above, a preferred embodiment of the present invention uses both verbal and non-verbal request/reply formats. A number of non-verbal request/reply formats can be used in implementing the present invention, and various embodiments employ different combinations of one or more suitable reply formats. One such reply format is a wireless markup language (WML) response. WML is a data format similar to hypertext markup language (HTML), except that WML is tailored for use in delivering Internet or other content to mobile phones and other similar wireless devices, while HTML is more commonly used to deliver content to conventional processing systems such as laptop computers, desktop computers and workstations. WML allows wireless devices conforming to the Wireless Application Protocol (WAP) to implement a web browser for display of information on a screen, in a manner similar to the way HTML compliant web browsers are used to display information on computers with larger screens. WML, like HTML, is tag-based, and supports text and image presentation, data input and forms. WAP compliant wireless devices commonly allow users to enter text by pressing number keys. In addition to WML and HTML, various embodiments of the present invention use modified HTML, Palm Query Access (PQA) or other suitable protocols. Note that in the following discussion, WML is used for exemplary purposes only, that the discussion applies equally to other suitable protocols including, but not limited to, those mentioned above.

When it is desired to send a WML request, or a WML response to a voice request, the WML request/response is sent via a WML response channel 114, which includes a WAP gateway 160, which formats the response according to WAP protocols for use with a wireless network. In a preferred embodiment of the present invention, WAP gateway 160 is an existing third party gateway, various implementations of which can be utilized in implementing the present invention. If a version of WML, such as WML 1.1 requires an active browser session to exist, a user having only a single wireless device would need to terminate the voice call that was used to send the voice request over voice request/response channel 112, and initiate a browser session in order to receive the WML response. To accommodate this eventuality, delivery of the response could be delayed for a sufficient amount of time to allow the user to initiate the required browser session. Other versions of WML, such as WML1.2, can provide the ability to deliver WML data without the need to initiate an active browser session. The use of a protocol that does not require an active browser session for message transmission, negates the need for a user to terminate a voice call before receiving a WML response.

Another non-verbal request/reply format that can be employed according to one embodiment of the present invention is a short messaging service (SMS) message. SMS is a "push" based protocol that can push short text messages to mobile phones and similar devices. Push technology is a client/server based model in which a server initiates information exchange with a client. Push transactions are the opposite of pull transactions, in which clients initiate information exchanges with servers. Those skilled in the art will recognize that conventional web browsers employ primarily pull transactions to retrieve information from desired Internet addresses through the use of uniform resource locators (URLs). It should be noted, however, that even though SMS messages are examples of the push model, SMS messages may be used in conjunction with pull protocols.

Consider, for example a mobile subscriber 110 who is driving through an unfamiliar city. Mobile subscriber 110 uses his mobile phone to make a voice request to receive information about restaurants that are near his present location. The voice request is delivered to web server 150, via voice request/response channel 112, and web server 150 uses speech services 155 to interpret the voice request. Web server 150 uses the interpreted voice request to gather information from data sources 190, which may include Internet sites and/or other information sources. In one embodiment, the information gathered by web server 150 could be the URL of a local entertainment web site that includes the name and location of restaurants in the area. In such an embodiment, web server 150 pushes the URL back to mobile subscriber 110 in an SMS message via an SMS message channel 116 that includes SMS gateway 170. As with WAP gateway 160, SMS gateway 170 is preferably a third party system used in implementing various embodiments of the present invention. The user can then view the SMS message, and use the URL to launch a browser that would retrieve (pull) the web page indicated by the URL. In another embodiment, specific pieces of information gathered by web server 150 are compiled into a text SMS message that is delivered to mobile subscriber 110 in place of or in addition to a URL. By providing specific pieces of information in an SMS text message, there is no need for a user to start a browser session to retrieve the desired information.

Simple mail transport protocol (SMTP) is used to deliver a non-verbal response to mobile subscriber 110 in another embodiment. SMTP is one type of electronic mail (e-mail) protocol, and allows information gathered by web server 150 to be delivered to mobile subscriber 110 as an e-mail message or attachment. The information is preferably formatted as a text e-mail message, and delivered through SMTP gateway 180 and SMS gateway 170 to mobile subscriber 110. In the above example, instead of initiating communications using a voice request, mobile subscriber 110 could have delivered an SMTP formatted e-mail request, and the web server 150 could have delivered a voice response to the SMTP request.

In another embodiment of the present invention, mobile subscriber 110 sets a bookmark to easily access the URL of a results page. Mobile subscriber 110 delivers a voice request to web server 150 via user-initiated lookup channel 118. Web server 150 gathers the information requested, and writes the information to a predetermined results page. Mobile subscriber 110 then retrieves the information from the predetermined results page using the bookmarked URL. The bookmarked URL can be activated by typing the URL into an address bar, selecting an icon displayed on a screen, activating a predetermined button or series of buttons on the mobile device being used by mobile subscriber 110, or by any other suitable method.

The preceding discussion has discussed FIG. 1 largely as a system in which mobile subscriber 110 provides a voice request, and web server 150 responds with a non-verbal reply. As noted earlier, however, the present invention may also be used "in reverse," such that mobile subscriber 110 provides a non-verbal request for information using a suitable protocol, such as SMTP, SMS or WML as previously described, and web server 150 provides a verbal response to mobile subscriber 110 via voice request/response channel 112. Numerous suitable combinations of voice and data interactions and protocols between mobile subscriber 110 and web server 150 may be implemented according to the principles set forth herein.

Figure 2:
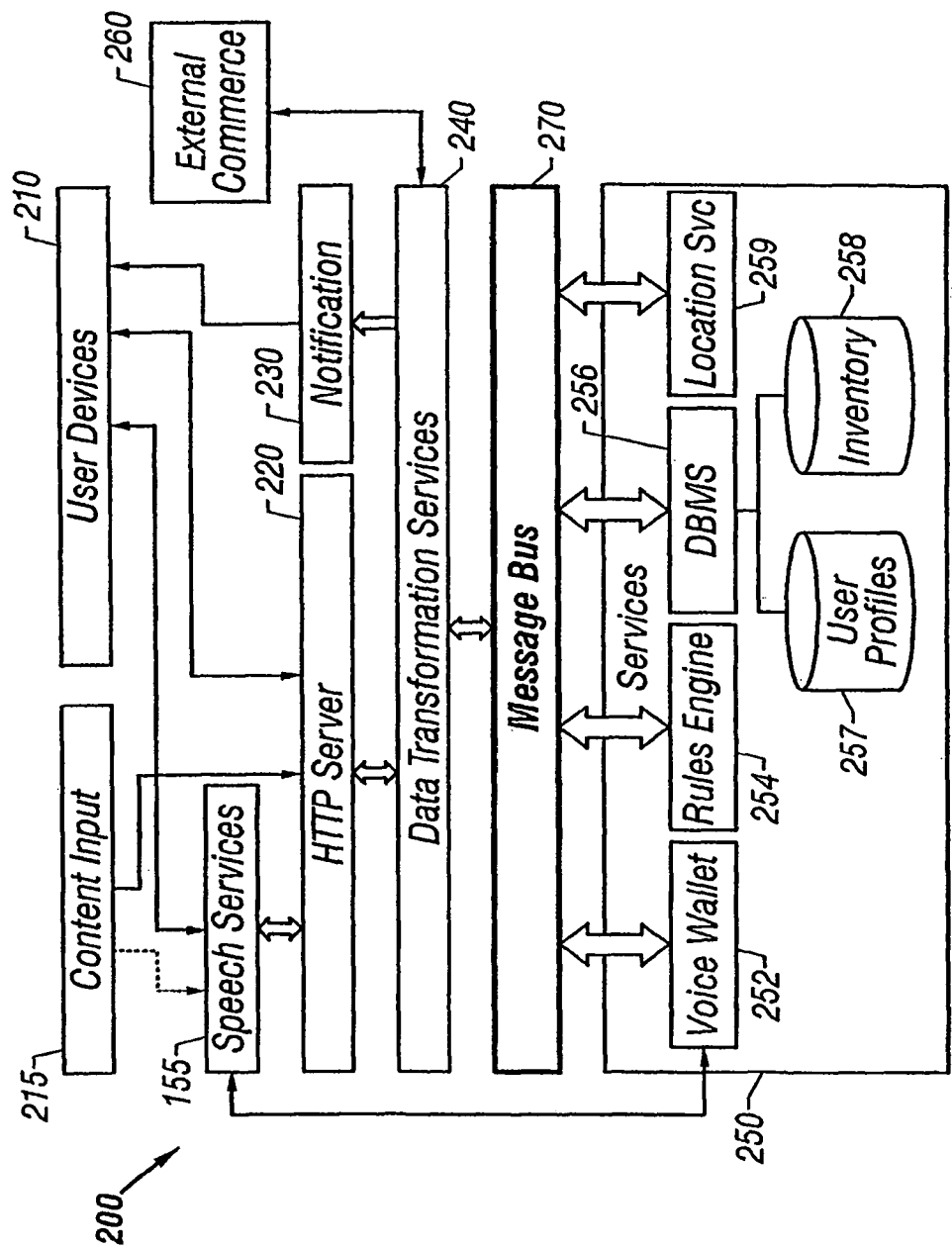
FIG. 2 is a block diagram of a system for conducting mixed-mode electronic commerce transactions according to one embodiment of the present invention.

Referring next to FIG. 2, a functional diagram of a mixed-mode system is illustrated, and designated generally by reference numeral 200. Services 250 that mixed-mode system 200 can use in implementing various embodiments of the present invention include, but are not limited to, voice wallet 252, rules engine 254, database 256, and location services 259. HTTP server 220 accesses services 250 through data transformation service 240 and message bus 270. Data transformation service 240 is also used to interface with notification server 230, and external commerce servers 260. User devices 210, which have been discussed in relationship to mobile subscriber 110 in FIG. 1, can interface with HTTP server 220 directly, or through speech services 155. Additionally, notifications can be delivered to user devices 210 through speech services 155 or directly from notification server 230 using various non-voice protocols, as previously discussed. Mixed-mode system 200 can receive content through content input 215. It should be noted that notifications, both verbal and non-verbal, are preferably session oriented. By providing session oriented notifications, mobile subscriber 100 (FIG. 1) can "drill-down" through multiple menu levels.

In one example of how mixed-mode system 200 can be used, mobile subscriber 110 (FIG. 1) sends a voice request from user devices 210 to HTTP server 220, via speech services 155. User devices 210 preferably include mobile phones or other user devices capable of both voice and data communications. However, in at least one embodiment, one device is a voice capable device, for example an older cellular telephone, and another device is data only enabled, such as some PDAs. These two devices can be used in combination to implement a mixed-mode system capable of sending voice requests and receiving data replies, or sending data requests and receiving voice replies.

Speech services 155 may include any suitable combination of hardware and software needed for speech recognition and/or translation. In one embodiment, speech services 155 is used to translate spoken requests into suitably formatted data for use by HTTP server 220. In other embodiments, speech services 155 is used to translate replies from HTTP server 220 into speech for delivery to a voice capable user device 210. Speech services 155 may also be used in conjunction with voice wallet 252, as subsequently discussed.

Content received through content input 215 can be either voice content that is routed to HTTP server after translation by speech services 155, or data content delivered directly to HTTP server 220. The content can include recorded audio and/or visual content for display, various types of information to be stored in database DBMS 256, or any other suitable type of content that may provide value or aid in implementing the present invention.

HTTP server 220 employs services 250 to fulfill requests from user devices 210. HTTP server 220 accesses services 250 through data transformation service 240, which in turn uses message bus 270. Data transformation service 240 supplies application program interfaces (APIs) for creating extensible markup language (XML) documents, as well as converting between different XML document dialects that may be employed by external commerce systems 260, or other external systems and devices. Various suitable scripting languages may be employed to perform these functions consistent with the objects of the present invention.

External commerce systems 260 include Internet web sites and web pages, private systems maintained by companies for inventory, scheduling, transportation, or other similar systems. External commerce systems 260 may be utilized to allow mobile subscriber 110 (FIG. 1) to make purchases directly from merchants in control of external commerce systems 260. Alternatively, external commerce systems 260 may supply information for storage in database DBMS 256 or for use by other services 250. Message bus 270 is used to add publish/subscribe capabilities to mixed-mode system 200, in addition to providing greater interoperability with external systems, improved internal modularity within mixed-mode system 200, and enhanced scalability.

Services 250 are used to provide value to mobile subscribers 110 (FIG. 1) employing user devices 210 to make queries and receive responses. In at least one embodiment, voice wallet 252 provides a secure, yet easily accessible voice authenticated storage area for sensitive purchasing information. Voice wallet 252 allows for storage of credit card numbers, expiration dates, personal identification numbers (PINs), and other information that may be used for purchasing transactions. Once a user stores purchasing information in his voice wallet 252, he does not need to enter the information again. To conduct purchase transactions, the user need only speak a predetermined phrase to recall any necessary transaction information, thereby eliminating the need to enter information each time a new purchase transaction is desired.

In at least one embodiment, the predetermined phrase is a user's phone number, or other non-secure phrase. To initialize security on his voice wallet 252, the user simply speaks the phrase, and the phrase is recorded. When the user desires to access his voice wallet 252, he need only speak the predetermined phrase into user device 210, which transmits the spoken phrase through speech services 155 to voice wallet 252. Voice wallet 252 compares the spoken phrases characteristics with the characteristics of the recorded phrase to determine if the speaker is authorized access to voice wallet 252. Using a voice authentication system to secure sensitive credit card information can relieve the user of tedious data entry, while providing an extremely high level of security.

Another service, rules engine 254 works in conjunction with information stored in database DBMS 256, and information received from external commerce system 260 and content input 215. Rules engine 254 correlates consumer interests with inventory attributes such as price, location and quantity, and with dynamic attributes such as time and threshold. The rules engine may be considered to be dual sided, inasmuch as one side performs evaluations of the interest rules and the other side evaluates and executes notification rules. In a preferred embodiment, each rule contains two sets of information. The first set of information is a 1 to n list of conditions and their Boolean relationships. The second set of information is a 1 to n list of actions to be taken when particular rules are evaluated as true. A very basic example is a rule that specifies sending an SMS message listing local produce suppliers with excess inventory in response to a standing request for notification of produce available for purchase at three o'clock every business day.

Much of the information upon which rules engine 254 operates is stored in database DBMS 256. DBMS 256 preferably includes user profiles database 257 and inventory database 258. Additional and/or different databases may be employed consistent with the objects of the present invention. Inventory database 258 may include information received from external commerce servers 260 and content input 215. User profiles database 257 preferably includes information associated with user preferences and purchasing patterns, shipping addresses, payment information, and the like. Some of this information is preferably supplied by mobile subscriber 110 (FIG. 1) through user devices 210, and other information is gleaned from past user actions. It will be appreciated that user profiles database 257 can include any suitable information that may be useful in providing mobile subscriber 110 pertinent information regarding available purchasing options or otherwise.

Inventory database 258 preferably includes information regarding available merchandise, services, accommodations, or other items available for purchase. Preferably, inventory database 258 is updated frequently by external commerce systems 260, so that the information in inventory database 258 accurately reflects currently available purchasing opportunities. In at least one embodiment of the present invention, information in user profiles database 257 is compared against currently available purchasing opportunities stored in inventory database 258 using rules engine 254 to determine when, and what type of notification should be sent to particular mobile subscribers 110.

In addition to the information stored in database DBMS 256, rules engine 254 may use information from location services 259 to determine when a notification should be sent to a particular one of user devices 210. Location services 259 are responsible for location determination and searching functions. These functions include, but are not limited to, geocoding addresses, route plotting, dynamic positioning, geodetic database searches, and the like. Once a mobile subscriber's position has been determined, rules engine 254 can use the position information to identify purchasing opportunities that are geographically relevant to the mobile subscriber 110. Location services 259 can be used in conjunction with information from inventory database 258, external commerce systems 260 or content input 215 to ensure that only relevant information is delivered to mobile subscriber 110. For example, if a mobile subscriber 110 is on a business trip, and submits a request to find a tailor, the user probably has no use for the phone number of a tailor in his home city, rather, he is likely to be interested only in finding a tailor near his current location. It will be appreciated that various locating mechanisms, including the use of global positioning satellite coordinates, user supplied coordinates, and location information available from cellular and PCS telephone systems, can be used without departing from the spirit and scope of the present invention.

Figure 3:
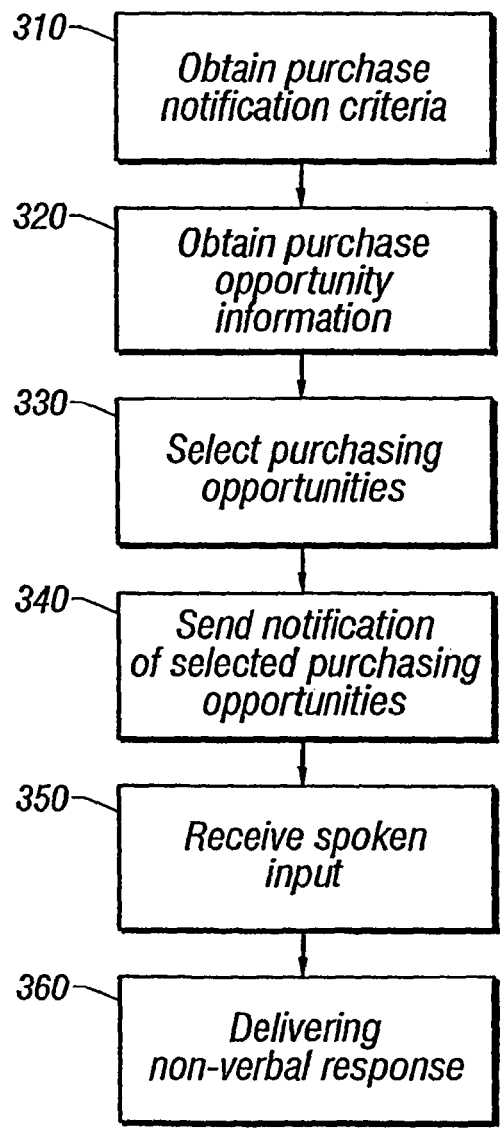
FIG. 3 is a flow diagram illustrating an "impulse" purchase transaction according to one embodiment of the present invention.

Referring next to FIG. 3, a method of using a mixed-mode system to conduct commerce will be discussed according to one embodiment of the present invention. The method begins at step 310, in which purchase notification criteria is obtained. Preferably, purchase notification criteria include specific circumstances or events identified by the user, the occurrence of which should trigger a notification. For example, a collector may specify that he wants to be notified of any Elvis memorabilia being offered for sale in a set geographical area around the collectors home. In other embodiments, additional notification criteria obtained or derived from sources other than the user may be employed consistent with the objects of the present invention. In addition to selecting conditions for notification, the collector may specify the type of notification he wishes to receive. For example, if the Elvis memorabilia is priced over $1,000 dollars, he may desire to receive an SMTP e-mail message on his mobile phone. If, however, the memorabilia is priced below $100 dollars, the collector may wish to receive an SMS message indicating contact information for the seller. In at least one embodiment, the notification may take the form of a voice notification via a mobile phone. Other notification methods have been discussed with reference to FIG. 1.

Once the purchase notification criteria have been obtained in step 310, purchasing opportunity information is obtained in step 320. Purchasing opportunity information includes, but is not limited to, description of the item for sale, price, availability, location, and similar information. Purchasing opportunity information may be stored in a database, such as inventory database 258 in FIG. 2, or may be obtained via the Internet or otherwise in a near-real-time fashion.

The method continues with step 330, in which purchasing opportunities are selected from the purchasing opportunities obtained in step 320. This selection is preferably based on the purchasing notification criteria obtained in step 310. In effect, step 330 looks for purchasing opportunities supplied by merchants that match notification criteria supplied by consumers. When a match is found, the method proceeds to step 340, and the mobile subscriber is notified of selected purchasing opportunities that meet the notification criteria. Various methods that can be used to provide user notification of purchasing opportunities have already been discussed earlier.

In at least one example, when the notification is sent to a user, the user's mobile device may provide an audible, visual or tactile alert to make the user aware that a notification has been received. The alert may be a special ringing or vibrating pattern, or any other suitable alert, including a standard ring, beep, etc. The user may respond to the notification to which he has just been alerted with a voice request to take advantage of one or more of the selected purchasing opportunities. In at least one embodiment, either voice or data notifications establish notification session, which incorporate drill-down type menus, so that the user can obtain more detailed or specific information.

In step 350 the user's voice request is received and processed by mixed-mode system 200 (FIG. 2). The processing may include accepting a purchase order, providing additional information regarding purchasing opportunities, altering the notification criteria, or otherwise. In many cases, a non-verbal response is delivered to the user's wireless device in response to the spoken request, in the same manner as the original notification was delivered.

Note that while a particular embodiment of a method according to the present invention has been discussed, numerous suitable variations may be employed in implementing the present invention. For example, in step 350, the user may provide non-verbal input, such as depressing a "yes/no" button or a designated sequence of keys, instead of providing spoken input. In addition, step 360 may deliver a verbal response instead of a non-verbal response. Additionally, the original notification provided in step 340 could be delivered in the form of a voice call that notifies the user of purchasing opportunities. Finally, various steps may be omitted or added. For example, in one embodiment, the user sends a voice and/or data request for information without first being prompted by a notification. The request may or may not be for information related to a purchase, and various embodiments of the present invention may be used for accessing the Internet or performing other purchase or non-purchase related tasks according to the mixed-mode principles set forth herein.

Figure 4:
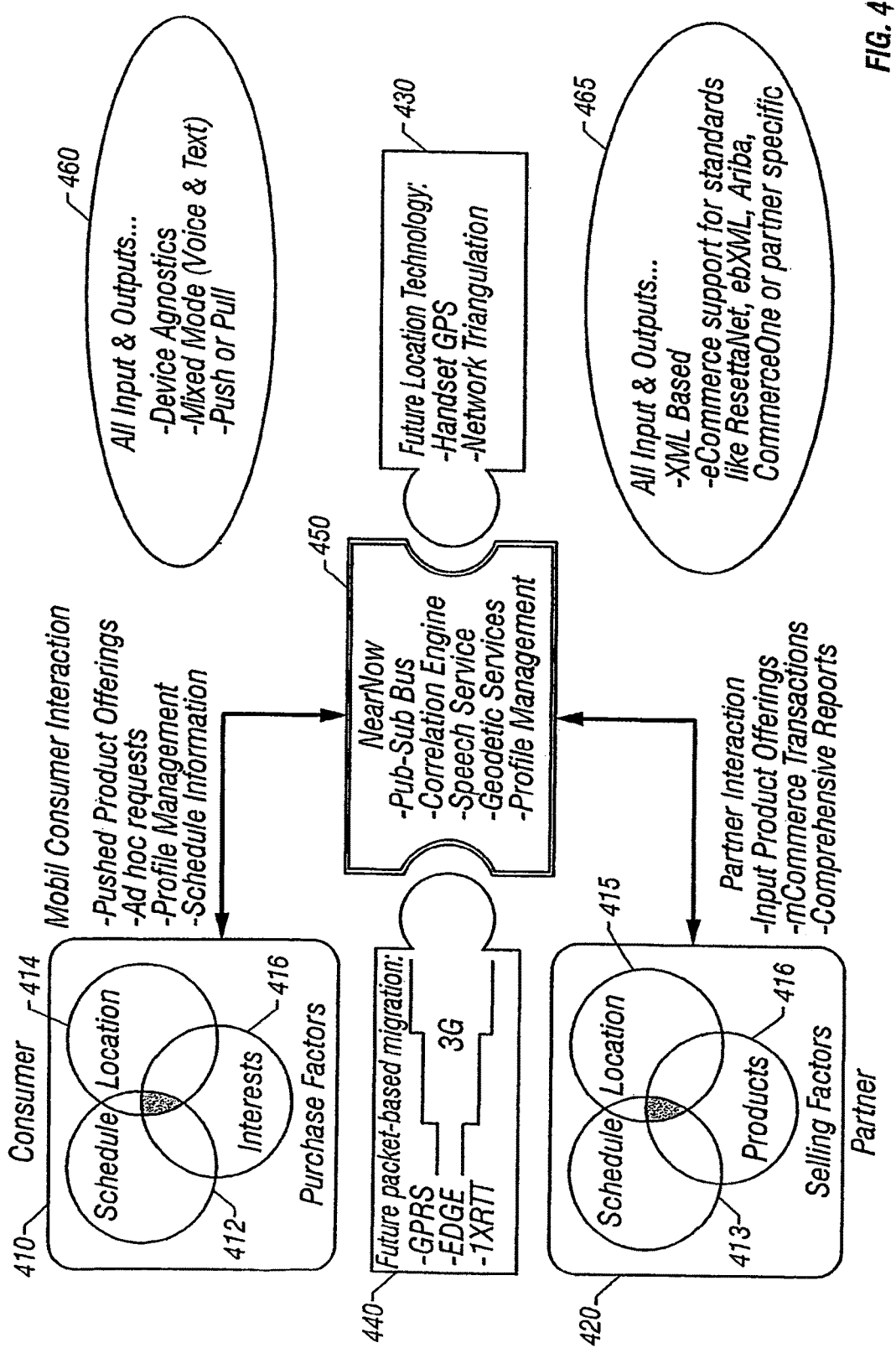
FIG. 4 is a block diagram representing a business model according to at least one embodiment of the present invention.

Referring next to FIG. 4, a basic business model according to one embodiment of the present invention will be discussed. Consumer 410 is assumed to be concerned with three main purchasing factors: scheduling 412, location 414, and interests 416. Scheduling 412 takes into account whether or not a purchasing opportunity is available when needed. For example, if a consumer 410 needs to purchase a new suit before an important meeting in two weeks, then a sale beginning a month later does not meet the scheduling concerns of consumer 410. Location 414 is related to the current location of consumer 410; if consumer 410 is in California, he is unlikely to be interested in a renting a car in New York. Finally, interests 416 are related to user preferences. If consumer 410 indicates that he is interested in purchasing a multi-family rental property on the North side of town, he is unlikely to appreciate being notified every time a single family dwelling on the South side of town comes on the market. However, when a particular purchasing opportunity satisfies all three of these factors, consumer 410 is likely to consider taking advantage of that purchasing opportunity.

One purchasing factor that immediately comes to mind in most cases is a price criterion. It will be appreciated that while not specifically illustrated, price may be included as an element of interests 416. Continuing with the previous example, if the consumer wishes to purchase a multi-family rental property in a particular price range, then notifying the consumer of opportunities that are significantly out of that range would likely be undesirable. Various methods of specifying a price range of interest can be employed without departing from the spirit and scope of the present invention. One example of how price ranges can be used is, by asking a user to select a "price tolerance preference" during an initial configuration phase, and presenting to the user opportunities having prices within this specified "price tolerance." It will be appreciated that interests 416 are not limited to price interests; instead interests 416 include any suitable user preferences that may be associated with particular items, services, objects and the like.

Partner 420 has goods, services, real-estate, information, or other items available for purchase. Partner 420 is concerned with selling factors including product schedule 413, product location 415 and products 416. Product schedule 413 relates to the availability of the product for sale, and product location 415 relates to where the product is physically located. For example, if partner 420 is a nationwide chain of automobile dealerships with a large inventory of unsold four-wheel drive trucks in Atlanta, but has a limited inventory of the same four-wheel drive trucks in Dallas, partner 420 will be most interested in attempting to sell the excess vehicles in Atlanta. The nature and quantity of products 416 to be sold are also a factor to be considered.

In at least one embodiment, a service provider employs a system 450 to correlate the purchase factors that are important to consumer 410, with the selling factors used by partner 420. When selling factors align with purchase factors, a notification of purchasing opportunities can be provided to the consumer. As illustrated in FIG. 4, system 450 is expandable to provide integration with both presently available resources, as illustrated by consumer input/output technologies 460 and partner input output technologies 465, and expected future technological advances, such as future packet-based migration 440 and future locator technology 430.

In summary, consider the following examples of particular mixed-mode transactions according to different embodiments of the present invention. In a first embodiment, an individual is at a shopping mall, and notices a surfboard on sale for "50% off." Wanting to know if the advertised sale price is really a bargain, he uses his mobile phone to place a voice request for surfboard prices. The request is received and translated by a system similar to the one described in FIG. 2. The system access its own databases, and finds some relevant information. Next the system searches the Internet, and retrieves information about surfboard prices from a dedicated surfboard resale web site. The system combines the information from the website and the database, and formats the information into an SMS text message. The SMS text message is used to send the combined information to the individual's mobile phone, which beeps upon receipt of the message to alert the user. The mobile phone user then views the information received, but wants more information about a particular surf board listed in the message. In at least one embodiment, the SMS text message includes drill-down menu capability. One way of providing drill-down capability is by including a WML tag in the SMS text message, thereby allowing the user to access a URL where more information can be found. The user selects the WML tag, which causes his mobile phone to initiate an active browser session and automatically direct him to the web site identified by the URL. The user now has all the information he needs to make an informed decision.

In a second example, consider a mobile subscriber 110 as discussed in FIG. 1. In this example, mobile subscriber 110 is an executive of a food preparation corporation seeking new freezing equipment to use in the freezing and preparation of frozen dinners. Since mobile subscriber 110 is interested in equipment used in frozen food preparation, he configures notification criteria specifying that when any cryogenic freezers become available for sale, he is to be notified by receipt of both an e-mail notification and a voice notification. Meanwhile, a small startup company begins manufacturing a new type of cryogenic freezer, and is looking for buyers. The small company partners with a provider of mixed-mode wireless systems, and allows the provider to advertise the new freezer to interested parties. The provider, through the use of various rule systems discussed earlier, matches the executive's notification criteria with the partner's selling criteria, and determines that a notification should be made.

The executive is called on his mobile phone, and a computer generated voice message is delivered, notifying him of the opportunity to purchase the freezer. At the same time, an e-mail message containing relevant information is delivered to his mobile phone. The executive may respond to either the voice notification or the e-mail message using either verbal or non-verbal means. As noted earlier, both the verbal notification and the non-verbal notification are preferably session oriented, thereby providing drill-down menu capabilities. Assuming that the executive responds to the voice notification by indicating that he wishes to purchase the freezer, he may be asked to speak a predetermined phrase to access his voice wallet, thereby allowing the purchase to be completed. Confirmation of the purchase can be sent to the executive's mobile phone using various messaging and/or voice formats.

In this third example, consider a mother running errands with her children. On her way home after a hectic shopping day, she realizes that she has forgotten to get one item; she needs to find a particular brand of pants in a hard to find size. Rather than going from store to store trying to find the needed pair of pants, she places a call on her web capable mobile phone and places a verbal request for the location of a store that has the needed pants in stock. She hangs up the phone, and moments later her phone beeps, alerting her that she has received and SMS message. The SMS message, generated as discussed earlier, has a location map of a store in her vicinity that keeps the desired pants in stock. She may then drive to the store and pick up the item. Alternatively, she may send a response to the SMS message (either verbal or via the web capabilities of her mobile phone) and request that the store put a hold on the pants. The store may, in turn, reply to the request for a hold by calling the mother on her mobile phone (or sending another SMS message), confirming that the pants are indeed on hold.

Consider now a final example of how an embodiment of the present invention may be employed in assisting a sales representative to more effectively manage distressed inventory. Assume that a sales representative for a candy company has a large lot of candy that is approaching the end of its storage life, and needs to be sold quickly. Just prior to attending an out-of-town conference meeting, the sales representative uses his wireless enabled mobile phone to verbally request a report on the number of units of candy sold in the past twenty-four hours. During the meeting, the sales representative receives a non-verbal response to his request for a sales report. The sales representative notes that sales are not proceeding as quickly as he would like, and so he sends a non-verbal reply to the non-verbal response, indicating that the candy's price should be reduced by ten percent.

In the preceding detailed description, reference has been made to the accompanying drawings which form a part hereof, and in which are shown by way of illustration specific embodiments in which the invention may be practiced. These embodiments, and certain variants thereof, have been described in sufficient detail to enable those skilled in the art to practice the invention, and it is to be understood that other suitable embodiments may be utilized and that logical, mechanical, chemical and electrical changes may be made without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

The invention claimed is:

1. Apparatus, comprising:
   a processor;
   computer memory holding computer program instructions to:
   receive first data indicating a permission to provide a mobile device user a notification, the notification having an associated notification criteria;
   at a given time, receive information identifying a determined location of a mobile device;
   based at least in part on a determined location of the mobile device and the notification criteria, to provide to the mobile device the notification, the notification being associated at the mobile device with one of: an audible, visual and tactile alert;
   receive second data as a result of an input being received at the mobile device following the notification;
   retrieve information associated with the input and the determined location of the mobile device; and
   provide to the mobile device a response to the input, the response based on the retrieved information.

2. The apparatus as described in claim 1 wherein the computer program instructions comprise a rules engine.

3. The apparatus as described in claim 1 wherein the input is one of: a spoken input, and a non-verbal input.

4. The apparatus as described in claim 2 wherein the rules engine also correlates data associated with a dynamic attribute.

5. The apparatus as described in claim 4 wherein the dynamic attribute is one of: time and threshold.

6. The apparatus as described in claim 1 wherein the message is one of: e-mail, SMS and URL.

7. The apparatus as described in claim 1 wherein the notification criteria that defines when a notification is to be delivered to the mobile device and a type of such notification.

8. The apparatus as described in claim 2 wherein the rules engine includes one or more matching rules, wherein the notification is provided is response to a match against one of the matching rules.

9. The apparatus as described in claim 1 wherein the information retrieved identifies one or more suppliers in the predetermined location with inventory that a user of the mobile device has expressed an interest in as indicated by the associated notification criteria.

10. The apparatus as described in claim 9 wherein the computer program instructions are operative to receive a message that indicates an interest of the user in purchasing an item in inventory.

\* \* \* \* \*